(12) United States Patent
Hertzler

(10) Patent No.: US 6,805,848 B2
(45) Date of Patent: Oct. 19, 2004

(54) BUILT-IN PURIFIER FOR HORIZONTAL LIQUEFIED GAS CYLINDERS

(75) Inventor: Benjamin Lee Hertzler, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 647 days.

(21) Appl. No.: 09/906,989

(22) Filed: Jul. 17, 2001

(65) Prior Publication Data
US 2003/0017089 A1 Jan. 23, 2003

(51) Int. Cl.[7] .............................................. F17C 13/00
(52) U.S. Cl. ...................................... 422/240; 62/50.7
(58) Field of Search ................................ 422/168–171, 422/177, 180, 190, 211, 222; 96/168, 147; 55/418; 222/189.1, 3, 464.2, 464.1; 220/581; 206/0.7; 62/440–466, 606, 617–657, 50.7, 48.1, 114, 317, 319

(56) References Cited

U.S. PATENT DOCUMENTS 1,821,549 A    9/1931  Horner et al.
2,513,181 A  * 6/1950  Kilham ............................ 222/3
4,032,311 A  * 6/1977  Bohmrich et al. ........... 55/385.4
4,665,956 A  * 5/1987  Freeman ......................... 141/5
5,409,526 A    4/1995  Zheng et al. ................. 96/132
5,980,599 A   11/1999  Chris et al. .................... 55/312
6,623,268 B2 * 9/2003  Diamond et al. ............ 431/344

FOREIGN PATENT DOCUMENTS

DE    3836071 A1 * 1/1990
FR    2341097 A  * 10/1977

* cited by examiner

Primary Examiner—Kiley Stoner
Assistant Examiner—Kevin McHenry
(74) Attorney, Agent, or Firm—Geoffrey L. Chase

(57) ABSTRACT

An apparatus for purifying a gaseous product delivered from a horizontal container containing a supply of a fluid includes an elongated hollow tube inside the container and a purifying medium inside the tube. The tube has a first opening, a second opening spaced apart from the first opening, and an internal axis between the first and second openings. The first opening is in fluid communication with a port and the second opening is in fluid communication with a vapor space in the container. A portion of the internal axis adjacent the second opening is at an angle greater than zero degrees relative to the horizontal longitudinal axis of the container.

22 Claims, 1 Drawing Sheet

BUILT-IN PURIFIER FOR HORIZONTAL LIQUEFIED GAS CYLINDERS

BACKGROUND OF THE INVENTION

The invention relates to chemical delivery systems, and in particular to an apparatus for containing, purifying, and delivering a gaseous product that is sufficiently pure for use in the electronics industry, such as for semiconductor fabrication and processing. However, the invention is not limited to those applications and may have other uses, such as in commercial processes that use high purity gas from tanks or cylinders of compressed or liquefied gas.

Semiconductor manufacturers require high-purity gases and chemicals for production processes to avoid defects in the fabrication of semiconductor devices. Typical processing steps include using cleaning solvents for initial wafer preparation, wet etching, chemical vapor deposition, and the like. The presence of very minute amounts of impurities at any one step may result in contamination of the wafer, which may result in a reduction in semiconductor device yield or having to scrap the chip.

As semiconductor feature sizes continue to shrink, increasingly greater demands are placed on the required purity of the gases and chemicals used to produce semiconductor devices. As a means to increase yields, semiconductor fabrication facilities ("fabs") commonly require process gases to meet particle specifications of less than 0.02 micron and metal specifications on the order of one part per billion or less. It is anticipated that industry standards will become more stringent in the future, as semiconductor feature sizes continue to shrink.

Electronic grades of process gases commonly have been supplied to semiconductor manufacturers in cylinders or tanks. However, as specifications regarding impurity concentrations have become more stringent, it has become more difficult to supply gases of sufficient purity for semiconductor processing. Even special preparation of the cylinders or containers by polishing and baking the inner surfaces fails to produce sufficient purity. Therefore, purifiers at the point of use often have been employed to remove contaminants and raise the purity of the gases on delivery.

Many prior art systems purify the gas after it exits the bulk container by using an external purifier. A disadvantage of this approach is that the piping between the bulk gas container and the external purifier is not protected in such systems. In addition, since the external purifier is required to withstand significant gas pressure, it can be very expensive.

Some gases are supplied in large, horizontal liquefied gas cylinders, such as "Y" cylinders. Examples include HCl, $Cl_2$, and $SF_6$. Large external purifiers are required to consistently and reliably meet the purity requirements of the processes using these gases. In addition to being expensive, these purifiers require a sizeable footprint in the facility layout.

In addition, the piping between the cylinder and purifier is not protected from the deleterious effects of moisture corrosion when moisture is present in the gas. This is particularly significant because the high pressure portions of the piping system are the most vulnerable to corrosion, since the partial pressure of moisture is the greatest at this point in a distribution system.

In attempting to address the problem, various approaches have been taken with in-tank purifiers. Although in-tank purifiers designed to remove contaminants from compressed gases or liquefied gases by high-pressure cylinders have been long known, as shown in U.S. Pat. No. 1,821,549 (Hornor, et al.), problems remain and those prior art in-tank purifiers do not meet the current or future purity requirements of the electronics industry.

U.S. Pat. No. 5,409,526 (Zheng, et al.) discloses an apparatus for purifying gases delivered from vertical gas cylinders. The built-in purifier taught by Zheng, et al. works well for vertical cylinders. However, such a straight tube purifier cannot be used in horizontal liquefied gas cylinders, because the tube might become submerged below the liquid level, leading to unpredictable and potentially adverse results during product withdrawal.

U.S. Pat. No. 5,980,599 (Chris, et al.) discloses an in-tank purifier using a displacable purifier body. The arrangement of this purifier also is limited to use in vertical cylinders, and the purifier would have similar problems with horizontal liquefied gas cylinders as discussed above for the built-in purifier of Zheng, et al.

It is desired to have an apparatus for purifying a gaseous product delivered from a horizontal container, especially a gaseous product that may be used in the fabrication of semiconductor devices.

It is further desired to have a horizontal container containing a supply of a fluid delivering a gaseous product that meets stringent purity requirements, such as the requirements for semiconductor manufacturing processes.

It is still further desired to have a more reliable apparatus and method for delivering a high-purity gaseous product for use in the electronics industry, such as for semiconductor manufacturing processes.

It also is desired to have an apparatus and method for delivering high-purity gaseous products which overcome the difficulties and disadvantages of the prior art to provide better and more advantageous results.

BRIEF SUMMARY OF THE INVENTION

The invention is an apparatus for purifying a gaseous product delivered from a substantially horizontal container containing a supply of a fluid. The invention also includes a substantially horizontal container for containing a supply of a fluid and delivering a gaseous product.

A first embodiment of the invention is an apparatus for purifying a gaseous product delivered from a substantially horizontal container adapted to contain a supply of a fluid. The container has a substantially horizontal axis, at least one inner wall, a first end, a second end opposite the first end, a port adjacent the first end, and an open interior for containing the fluid between the at least one inner wall and the first and second ends. At least part of the open interior is a vapor space. The apparatus includes an elongated hollow tube and a purifying medium disposed in at least a portion of the elongated hollow tube. The elongated hollow tube has a first opening, a second opening spaced apart from the first opening, and an internal axis between the first and second openings. The first opening is in fluid communication with the port and the second opening is in fluid communication with the vapor space. The portion of the internal axis adjacent the second opening is at an angle greater than zero degrees relative to the substantially horizontal longitudinal axis. The purifying medium is disposed between the first and second openings of the elongated hollow tube.

There are several variations of the first embodiment of the apparatus. In one variation, the gaseous product is used in the fabrication of a semiconductor device. In another variation, the fluid is selected from a group consisting of a compressed gas, a liquefied compressed gas, and a supercritical fluid. In yet another variation, the purifying medium comprises at least one layer of a material selected from a group consisting of at least one catalyst, at least one adsorbent, and at least one mixture thereof. In still another variation, the angle is about 45 degrees (45°).

There also are alternate embodiments of the apparatus. Several of these embodiments are similar to the first embodiment of the apparatus but include an additional element or feature. For example, a second embodiment of the apparatus includes a first filter disposed in the vapor space and in fluid communication with the second opening. A third embodiment of the apparatus includes a second filter adjacent the first opening and in fluid communication with the elongated hollow tube. A fourth embodiment of the apparatus includes control means in fluid communication with the port and adapted to control delivery of the gaseous product from the substantially horizontal container and delivery of the fluid to the substantially horizontal container.

A fifth embodiment is an apparatus for purifying a gaseous product to be used in the fabrication of a semiconductor device, the product being delivered from a substantially horizontal container having a substantially cylindrical shape adapted to contain a supply of a liquid. The container has a substantially horizontal longitudinal axis, at least one inner wall, a first end, a second end opposite the first end, a port adjacent the first end, and an open interior for containing the liquid between the at least one inner wall and the first and second ends. At least part of the open interior is a vapor space above a surface of the liquid. The apparatus includes at least five elements. The first element is an elongated hollow tube disposed in the open interior of the horizontal container. The elongated hollow tube has a first opening and a second opening spaced apart from the first opening. The first opening is in fluid communication with the port and the second opening is in fluid communication with the vapor space. A first portion of the tube proximate the opening is substantially parallel to the substantially horizontal longitudinal axis. A second portion of the tube distal the first opening is at an angle greater than zero degrees relative to the substantially horizontal axis. The second element is a purifying medium disposed in at least a portion of the elongated hollow tube between the first opening and the second opening. The purifying medium comprises at least one layer of a material selected from a group consisting of at least one catalyst, at least one adsorbent, and at least one mixture thereof. The third element is a first filter disposed in the vapor space and in fluid communication with the second opening. The fourth element is a second filter adjacent the first opening and in fluid communication with the elongated hollow tube. The fifth element is a control means in fluid communication with the port and adapted to control delivery of the gaseous product from the substantially horizontal container and delivery of a source of the liquid to the substantially horizontal container. (The source of the liquid may be gaseous, liquid, a two-phase fluid, or any combination thereof.)

Another aspect of the invention is a substantially horizontal container for containing a supply of a fluid and delivering a gaseous product. A first embodiment of the container has a built-in purifier for purifying the gaseous product delivered from the container. The container has a substantially horizontal longitudinal axis, at least one inner wall, a first end, a second end opposite the first end, a port adjacent the first end, and an open interior for containing the fluid between the at least one inner wall and the first and second ends. At least part of the open interior is a vapor space. The built-in purifier includes an elongated hollow tube disposed in the open interior of the horizontal container and a purifying medium disposed in at least a portion of the elongated hollow tube. The elongated hollow tube has a first opening, a second opening spaced apart from the first opening, and an internal axis between the first and second openings. The first opening is in fluid communication with the port and the second opening is in fluid communication with the vapor space. A portion of the internal axis adjacent the second opening is at an angle greater than zero degrees relative to the substantially horizontal longitudinal axis. The purifying medium is disposed between the first and second openings of the elongated hollow tube.

There are several variations of the first embodiment of the container. In one variation, the gaseous product is used in the fabrication of a semiconductor device. In another variation, the fluid is selected from a group consisting of a compressed gas, a liquefied compressed gas, and a supercritical fluid. In yet another variation, the purifying medium includes at least one layer of a material selected from a group consisting of at least one catalyst, at least one adsorbent, and at least one mixture thereof. In still another variation, the angle is at about 45 degrees (45°). In yet still another variation, at least a portion of the fluid is a liquid having a substantially horizontal liquid surface, and the container has a visually observable index designating a desired positioning of the container in a predetermined desired position. When the container is positioned approximately in the predetermined desired position, the second opening is located in the vapor space. Preferably, the desired positioning provides for a perpendicular distance between the liquid surface and the second opening at or substantially near a maximum perpendicular distance obtainable between the liquid surface and the second opening.

There also are several alternate embodiments of the container. Several of these embodiments are similar to the first embodiment of the container but include at least one additional element or feature. For example, a second embodiment of the container includes a first filter disposed in the vapor space and in fluid communication with the second opening. A third embodiment of the container includes a second filter adjacent the first opening and in fluid communication with the elongated hollow tube. A fourth embodiment of the container includes control means in fluid communication with the port and adapted to control delivery of the gaseous product from the substantially horizontal container and delivery of the fluid to the substantially horizontal container.

A fifth embodiment is a substantially horizontal container having a substantially cylindrical shape for containing a supply of a liquid having a substantially horizontal liquid surface and for delivering a gaseous product to be used in the fabrication of a semiconductor device. The container has a built-in purifier for purifying the gaseous product delivered from the container and having a substantially horizontal longitudinal axis, an inner wall, an outer wall, a first end, a second end opposite the first end, a port adjacent the first end, and a open interior for containing the liquid between the inner wall and the first and second ends. At least part of the open interior is a vapor space above the liquid surface. The built-in purifier includes at least five elements. The first element is an elongated hollow tube disposed in the open interior of the horizontal container. The elongated hollow tube has a first opening, a second opening spaced apart from the first opening, and an internal axis between the first and second openings. The first opening is in fluid communication with the port and the second opening is in fluid communication with the vapor space. A first portion of the tube proximate the first opening is substantially parallel to the substantially horizontal longitudinal axis. A second portion of the tube distal the fist opening is at an angle greater than zero degrees relative to the substantially horizontal longitudinal axis. The second element is a purifying medium disposed in at least a portion of the elongated hollow tube between the first opening and the second opening. The purifying medium includes at least one layer of a material selected from a group consisting of at least one catalyst, at least one adsorbent, and at least one mixture thereof. The third element is a first filter disposed in the vapor space and in fluid communication with the second opening. The fourth element is a second filter adjacent the first opening and in fluid communication with the elongated hollow tube. The fifth element is a control means in fluid communication with the port and adapted to control delivery of the gaseous product from the substantially horizontal container and delivery of a source of the liquid to the substantially horizontal container. (The source of the liquid may be gaseous, liquid, a two-phase fluid, or any combination thereof.)

In a variation of the fifth embodiment of the container, the container has a visually observable index designating a desired positioning of the container in a predetermined desired position. When the container is positioned approximately in the predetermined desired position, the second opening is located in the vapor space. Preferably, the desired positioning provides for a perpendicular distance between the liquid surface and the second opening at or substantially near a maximum perpendicular distance obtainable between the liquid surface and the second opening.

BRIEF DESCRIPTION OF SEVERAL VIEWS OF THE DRAWINGS

The invention will be described by way of example with reference to the accompanying drawing, in which.

DETAILED DESCRIPTION OF THE INVENTION

Figure 1:
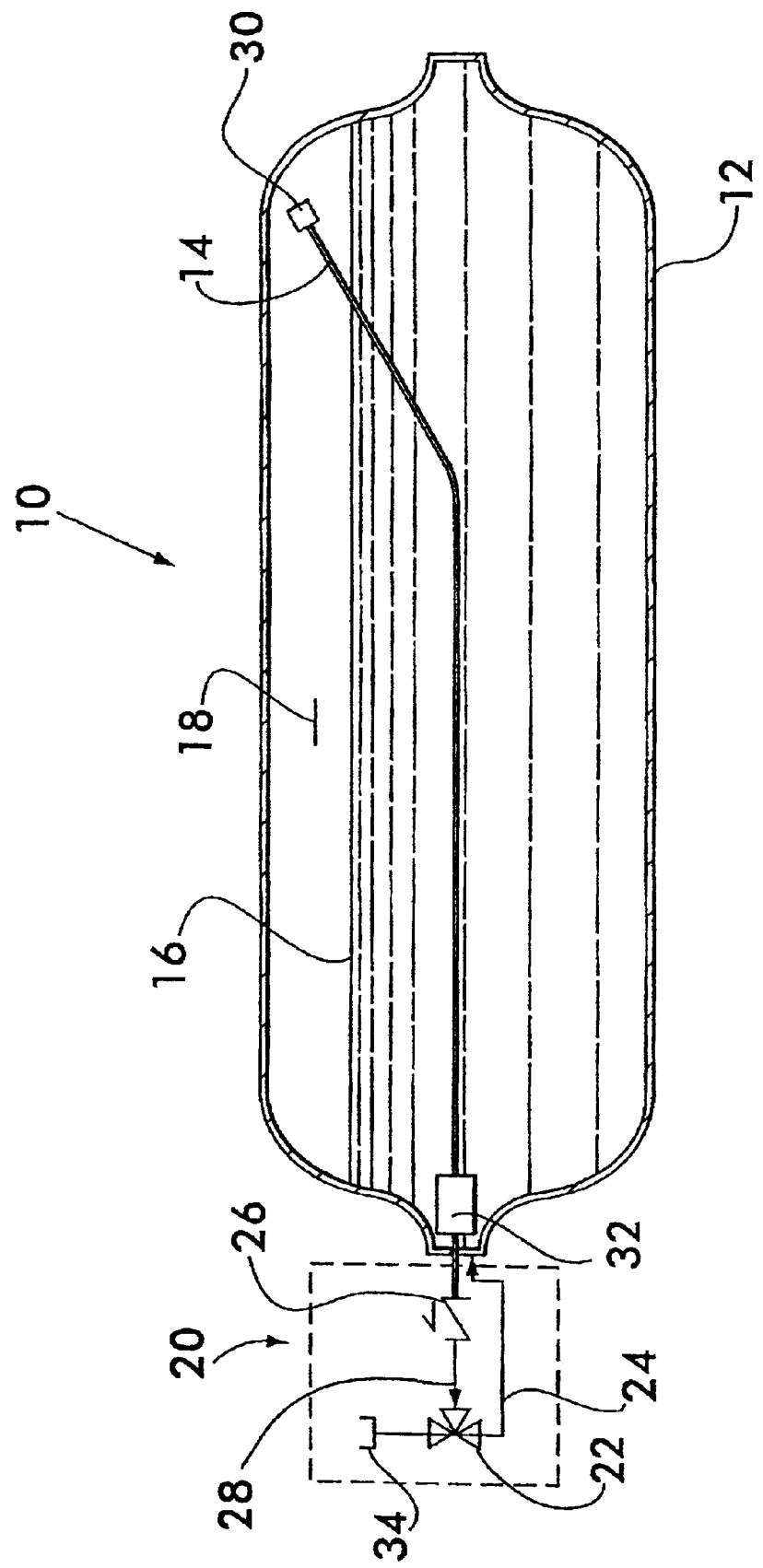
FIG. 1 is a schematic illustration of one embodiment of the invention.

The invention is an apparatus 10 for purifying a gaseous product delivered from a horizontal container 12, such as the horizontal cylinder shown in FIG. 1. The apparatus utilizes a built-in purifier tube 14 located inside the horizontal container, which contains a supply of a fluid to be vaporized. A purifying medium or media (not shown) may be catalyst or adsorbent based, or some combination thereof, including multiple adsorbents and catalysts. If multiple adsorbents or catalysts are used, these may be homogeneously mixed or may be deposited in multiple layers of different purification media within the tube. The built-in purifier is designed such that the fluid in the container may be a compressed gas, a liquefied compressed gas, or a supercritical fluid. The built-in purifier has many uses, including but not limited to use in the apparatus and method discussed in a patent application being filed concurrently with this application Ser. No. 09/906,987 and which is entitled "Bulk Gas Built-In Purifier with Dual Valve Bulk Container", which patent application is incorporated herein by reference.

When the fluid is a liquefied compressed gas, the built-in purifier tube 14 is configured so that it does not act as a siphon to remove liquid rather than vapor. To avoid such a siphoning effect, the tube is oriented so that the tube inlet extends above the liquid level 16 so that the open tube inlet communicates with the vapor space 18 above the liquid. In a preferred embodiment, the tube bends upward at about a 45° angle and terminates within about 1 inch of the inner wall of the container.

As a result of bending the tube 14 at an angle, it has at least two portions. For example, it may have a first portion parallel to the horizontal longitudinal axis of the container and a second portion at an angle to the horizontal longitudinal axis of the container, the angle being greater than zero degrees, and preferably about 45°.

Preferably each portion of the tube has a substantially uniform shape that is substantially symmetrical about an "internal axis" corresponding to a center line of each portion of the tube. However, persons skilled in the art will recognize that other arrangements are possible. For example, the tube could be bent in more than one location, resulting in more than two portions. Also, the tube need not be substantially uniform nor substantially symmetrical about an "internal axis," in which case the internal axis would be a continuous imaginary line ("axis") inside the tube running from one end of the tube to the other end but would not correspond to a single center line (but rather would vary throughout the tube). Persons skilled in the art also will recognize that the container need not have a uniform shape symmetrical about the horizontal longitudinal axis of the container, although such a shape is preferable in a preferred embodiment.

A valve assembly 20 is used to control both delivery of the fluid to the container 12 and delivery of the gaseous product from the container, which is connected to a gas distribution system (not shown) via connection 34. In a preferred embodiment, the valve assembly includes a three-way valve 22, as shown in FIG. 1. A separate fill line 24 allows for filling of the container in a manner that the fill gas is diverted around the purifier tube 14. A check valve 26 is located in the product withdrawal line 28 downstream of the purifier to prevent reverse flow through the built-in purifier. Persons skilled in the art will recognize that alternate arrangements of valves and piping are possible.

As shown in FIG. 1, a filter 30 is located at the inlet of the purifier tube 14. This filter acts as a hold down screen to contain the purifying medium and as a rudimentary demister pad to avoid gross or excessive exposure of the purifying medium to the liquid due to splashing of the liquid during transportation and handling. A second filter 32 at the outlet of the purifier tube is included to remove any particles from the gas leaving the purifying medium.

In a preferred embodiment, the container 12 is a cylindrical vessel. However, persons skilled in the art will recognize that the container may have a shape other than cylindrical. The container and/or valve 22 may be indexed by some type of marking (e.g., coloring, an arrow, an indentation) or other means so that an operator preferably will place the container in a position to ensure that the tube inlet and filter 30 of the purifier tube 14 always are oriented so that the tube inlet is above the liquid level 16.

There are a number of benefits and advantages of the present invention which reduce the cost of bulk gas purification. For example, the purifier can be fabricated at a significantly lower cost because the container does not have to contain high pressure gas as well as minute leaks, since both the inside and outside of the purifier are contained within the container. Also, by incorporating the purifier inside the container at the full source pressure, moisture is eliminated from the gas stream before it can contaminate the high pressure side of the gas distribution system. Other benefits are greater gas consistency, superior gas purity, longer shelf life, lower operating costs, and reduced cost of ownership.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An apparatus for purifying a gaseous product delivered from a substantially horizontal container adapted to contain a supply of a fluid, said container having a substantially horizontal longitudinal axis, at least one inner wall, a first end, a second end opposite said first end, a port adjacent said first end, and an open interior for containing said fluid between said at least one inner wall and said first and second ends, at least part of said open interior being a vapor space, comprising:

an elongated hollow tube disposed in said open interior of said horizontal container, said elongated hollow tube having a first opening, a second opening spaced apart from said first opening, and an internal axis between the first and second openings, said first opening being in fluid communication with said port and said second opening being in fluid communication with said vapor space, wherein a portion of said internal axis adjacent said second opening is at an angle greater than zero degrees relative to said substantially horizontal longitudinal axis; and a purifying medium disposed in at least a portion of said elongated hollow tube between said first opening and said second opening.

2. An apparatus as in claim 1, wherein said purifying medium comprises at least one layer of a material selected from a group consisting of at least one catalyst, at least one adsorbent, and an at least one mixture thereof.

3. An apparatus as in claim 1, wherein said fluid is selected from a group consisting of a compressed gas, a liquefied compressed gas, and a supercritical fluid.

4. An apparatus as in claim 1, wherein said angle is about 45 degrees (45°).

5. An apparatus as in claim 1, further comprising a first filter disposed in said vapor space and in fluid communication with said second opening.

6. An apparatus as in claim 5, further comprising a second filter adjacent said first opening and in fluid communication with said elongated hollow tube.

7. An apparatus as in claim 1, further comprising control means in fluid communication with said port and adapted to control delivery of said gaseous product from said substantially horizontal container and delivery of said fluid to said substantially horizontal container.

8. An apparatus as in claim 1, wherein said gaseous product is used in the fabrication of a semiconductor device.

9. An apparatus for purifying a gaseous product to be used in the fabrication of a semiconductor device, said product delivered from a substantially horizontal container having a substantially cylindrical shape adapted to contain a supply of a liquid, said container having a substantially horizontal longitudinal axis, at least one inner wall, a first end, a second end opposite said first end, a port adjacent said first end, and an open interior for containing said liquid between said at least one inner wall and said first and second ends, at least part of said open interior being a vapor space above a surface of said liquid, comprising:

an elongated hollow tube disposed in said open interior of said horizontal container, said elongated hollow tube having a first opening, a second opening spaced apart from said first opening, said first opening being in fluid communication with said port and said second opening being in fluid communication with said vapor space, wherein a first portion of said tube proximate said first opening is substantially parallel to said substantially horizontal longitudinal axis and a second portion of said tube distal said first opening is at an angle greater than zero degrees relative to said substantially horizontal longitudinal axis;

a purifying medium disposed in at least a portion of said elongated hollow tube between said first opening and said second opening, wherein said purifying medium comprises at least one layer of a material selected from a group consisting of at least one catalyst, at least one adsorbent, and at least one mixture thereof;

a first filter disposed in said vapor space and in fluid communication with said second opening;

a second filter adjacent said first opening and in fluid communication with said elongated hollow tube; and control means in fluid communication with said port and adapted to control delivery of said gaseous product from said substantially horizontal container and delivery of a source of said liquid to said substantially horizontal container.

10. A substantially horizontal container for containing a supply of a fluid and delivering a gaseous product, said container having a built-in purifier for purifying said gaseous product delivered from said container having a substantially horizontal longitudinal axis, at least one inner wall, a first end, a second end opposite said first end, a port adjacent said first end, and an open interior for containing said fluid between said at least one inner wall and said first and second ends, at least part of said open interior being a vapor space, wherein said built-in purifier comprises:

an elongated hollow tube disposed in said open interior of said horizontal container, said elongated hollow tube having a first opening, a second opening spaced apart from said first opening, and an internal axis between the first and second openings, said first opening being in fluid communication with said port and said second opening being in fluid communication with said vapor space, wherein a portion of said internal axis adjacent said second opening is at an angle greater than zero degrees relative to said substantially horizontal longitudinal axis; and a purifying medium disposed in at least a portion of said elongated hollow tube between said first opening and said second opening.

11. A container as in claim 10, wherein at least a portion of said fluid is a liquid having a substantially horizontal liquid surface and wherein said container has a visually observable index designating a desired positioning of said container in a predetermined desired position, whereby said second opening is located in said vapor space when said container is positioned approximately in said predetermined desired position.

12. A container as in claim 11, wherein said desired positioning provides for a perpendicular distance between said liquid surface and said second opening at or substantially near a maximum perpendicular distance obtainable between said surface and said second opening.

13. A container as in claim 10, wherein said purifying medium comprises at least one layer of a material selected from a group consisting of at least one catalyst, at least one adsorbent, and at least one mixture thereof.

14. A container as in claim 10, wherein said fluid is selected from a group consisting of a compressed gas, a liquefied compressed gas, and a supercritical fluid.

15. A container as in claim 10, wherein said angle is about 45 degrees (45°).

16. A container as in claim 10, further comprising a first filter disposed in said vapor space and in fluid communication with said second opening.

17. A container as in claim 16, further comprising a second filter adjacent said first opening and in fluid communication with said elongated hollow tube.

18. A container as in claim 10, further comprising control means in fluid communication with said port and adapted to control delivery of said gaseous product from said substantially horizontal container and delivery of said fluid to said substantially horizontal container.

19. A container as in claim 10, wherein said gaseous product is used in the fabrication of a semiconductor device.

20. A substantially horizontal container having a substantially cylindrical shape for containing a supply of a liquid having a substantially horizontal liquid surface and for delivering a gaseous product to be used in the fabrication of a semiconductor device, said container having a built-in purifier for purifying said gaseous product delivered from said container and having a substantially horizontal longitudinal axis, an inner wall, an outer wall, a first end, a second end opposite said first end, a port adjacent said first end, and an open interior for containing said liquid between said inner wall and said first and second ends, at least part of said open interior being a vapor space above said liquid surface, wherein said built-in purifier comprises:

an elongated hollow tube disposed in said open interior of said horizontal container, said elongated hollow tube having a first opening, a second opening spaced apart from said first opening, and an internal axis between the first and second openings, said first opening being in fluid communication with said port and said second opening being in fluid communication with said vapor space, wherein a first portion of said tube proximate said first opening is substantially parallel to said substantially horizontal longitudinal axis and a second portion of said tube distal said first opening is at an angle greater than zero degrees relative to said substantially horizontal longitudinal axis;

a purifying medium disposed in at least a portion of said elongated hollow tube between said first opening and said second opening, wherein said purifying medium comprises at least one layer of a material selected from a group consisting of at least one catalyst, at least one adsorbent, and at least one mixture thereof;

a first filter disposed in said vapor space and in fluid communication with said second opening;

a second filter adjacent said first opening and in fluid communication with said elongated hollow tube; and control means in fluid communication with said port and adapted to control delivery of said gaseous product from said substantially horizontal container and delivery of a source of said liquid to said substantially horizontal container.

21. A container as in claim 20, wherein said container has a visually observable index on said outer wall or on an outer surface of said control means, said index designating a desired positioning of said container in a predetermined desired position, whereby said second opening is located in said vapor space when said container is positioned approximately in said predetermined desired position.

22. A container as in claim 21, wherein said desired positioning provides for a perpendicular distance between said liquid surface and said second opening at or substantially near a maximum perpendicular distance obtainable between said liquid surface and said second opening.

\* \* \* \* \*